May 31, 1938.   P. NOWAK   2,119,400
INSULATING BAND FOR ELECTRICAL MACHINES AND APPARATUS
Filed May 27, 1936
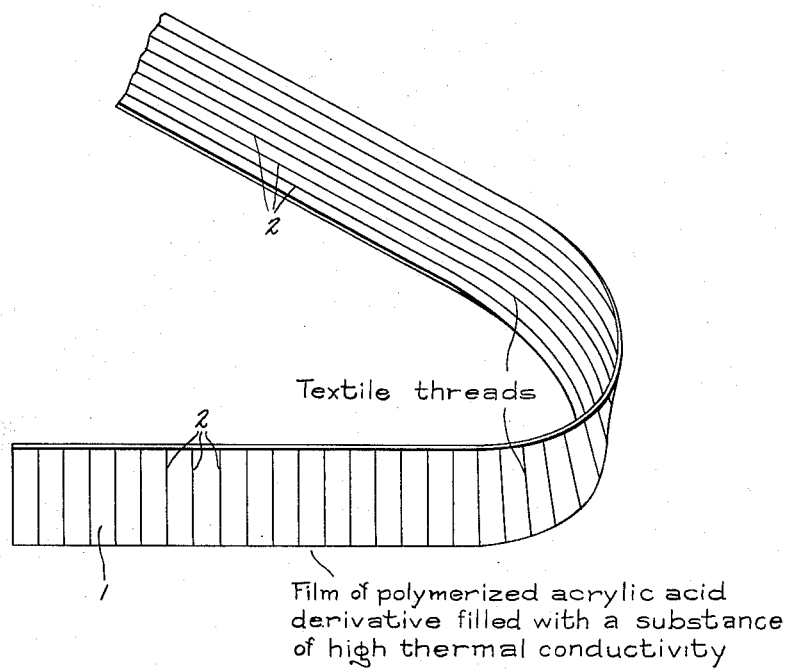
Inventor:
Paul Nowak,
by Harry E. Dunham
His Attorney.

Patented May 31, 1938

2,119,400

UNITED STATES PATENT OFFICE 2,119,400

INSULATING BAND FOR ELECTRICAL MACHINES AND APPARATUS

Paul Nowak, Berlin-Charlottenburg, Germany, assignor to General Electric Company, a corporation of New York Application May 27, 1936, Serial No. 82,155
In Germany June 4, 1935

5 Claims. (Cl. 154—2.6)

This invention relates to insulating bands for electrical machines and apparatus and to the processes of making the same.

One of the chief problems in the construction of electrical machines and apparatus is that of removing the heat from the windings to the exterior without allowing it to accumulate. The insulations hitherto used, for example, in winding heads of machines, consist of bands of highly insulating materials which are wound around the conductors in layer thicknesses up to about 3 mm. These bands fulfill well the purpose of effectively insulating the windings from the exterior and from one another, but are very unfavorable as regards the removal of heat. Since the insulating layers consist of several superimposed bands between which heat accumulation occurs owing to the air layers existing between the bands, they usually have a specific thermal resistance between 1100 and 1500 thermal ohms, so that their thermal surface resistance for a layer thickness of 3 mm. may be estimated at approximately 500 thermal ohms per square centimeter. The thermal resistance outward to air might be estimated at 800 thermal ohms at 40° C. excess temperature. Since, however, in this case, the winding head is usually ventilated, this resistance diminishes to about 300 thermal ohms. The heat current emanating from the conductor surface thus undergoes a thermal resistance altogether of approximately 500 thermal ohms.

The invention is based on the problem of very considerably reducing the thermal resistance without impairing the insulating qualities of the winding at the same time. According to the invention, for the insulation of electrical conductors and windings of electrical machines and apparatus use is made of bands which consist of a web, braiding or the like, for example, of textile threads or yarn of cotton, linen, asbestos, or the like, to which is applied an insulating material of high thermal conductivity, for example, an insulating mass which is filled with crystalline elements or metallic oxides. The insulating material used in this case has, for example, the following composition:

| | Parts by weight |
|---|---|
| Polymerized acrylic acid esters | 170 |
| Beta-naphthol | 5 |
| Quartz powder | 415 |
| Microasbestos | 410 |

A mass of such composition may be rolled out to thin films and then worked with the coating or intermediate layer of material. The insulating masses of high thermal conductivity which are used according to the invention do not possess in themselves the mechanical strength required for winding bands, chiefly due to the exceptionally high content of filler such as powdered quartz, metallic oxides alone or admixed with other crystalline substances. It is only due to the fact that these masses are worked together with bands of textile material that winding bands are obtained which, besides their great insulating capacity and thermal conductivity, passess the mechanical strength necessary for insulating conductors and windings. The masses of high thermal conductivity are rolled or stuck on to the firm texture or web, or rolled into the latter.

The insulating bands according to the invention have a specific thermal resistance between 100 and 150 thermal ohms. With a layer thickness for the insulation of 3 mm. this gives a thermal surface resistance of about 30–50 thermal ohms per square centimeter and, if the thermal resistance between the insulation and air is estimated at 300 thermal ohms as above, a total intermediate resistance from the conductor to the air of about 350 thermal ohms results. This means an exceptionally great reduction of the temperature drop in comparison with the above-mentioned resistance values of customary bindings.

As basic material for the construction of the insulating mass of high thermal conductivity it is suitable to use besides the above-mentioned polymers of the acrylic acid esters, any other insulating masses which can be filled in the greatest possible quantity with substances of high thermal conductivity such as quartz, asbestos, microasbestos, or with oxidized metallic elements such as aluminum oxide. For example, rubber, linseed oil or any mass similar to these may be used as basic material. The following mass, for example, has also proved to be suitable:

| | Parts by weight |
|---|---|
| Crepe rubber | 250 |
| Sulphur | 10 |
| Magnesium carbonate | 138 |
| Quartz powder | 300 |
| Microasbestos | 300 |
| Diphenyl guanidine (Vulkazit D) | 2 |

This mass is rolled on to textile bands in the unvulcanized condition and then vulcanized together with the latter.

Although it has already been proposed to increase the thermal conductivity of insulating masses by mixing powdered quartz or the like with them, the invention makes it possible for the first time to utilize in electro-technics such heat-conducting masses for the manufacture of insulated wires, such as are used in electrical machine construction for making coil windings.

A constructional example of an insulating layer according to the invention is represented in the drawing. The polymerized acrylic acid derivatives which are filled, for example, with powdered quartz or material having approximately the thermal conductivity properties of quartz, which latter expression is intended to include quartz itself, are rolled out into a film 1, which is firmly connected on both sides with threads 2 which lie parallel and close to one another and which have on one side a direction differing by 90° from that of the threads on the other side. The threads may consist of texture or interwoven filaments of fibrous material.

What I claim as new and desire to secure by Letters Patent of the United States, is:—

1. An article of manufacture comprising an electrically insulating band consisting of an intimate association of textile material and an insulating mass comprising polymerized acrylic acid derivative containing a substantial amount of filling material having approximately the thermal conductivity properties of quartz.

2. Insulation for conductors and windings in electrical machines and apparatus comprising a band consisting of textile threads in contact with an insulating mass comprising polymerized acrylic acid derivative filled with a substantial amount of material having approximately the thermal conductivity properties of quartz.

3. An insulating band for conductors and windings in electrical machines and apparatus consisting of a web of textile material united with an insulating mass comprising a polymerized acrylic acid ester filled with a substantial amount of powdered quartz.

4. An insulating band for conductors and windings in electrical machines and apparatus consisting of a web of asbestos yarn united with an insulating mass comprising a polymerized acrylic acid ester filled with a substantial amount of material having approximately the thermal conductivity properties of quartz.

5. An insulating band for conductors and windings in electrical machines and apparatus consisting of a film of an insulating mass comprising a polymerized acrylic acid ester filled with material of high thermal conductivity comprising powdered quartz, said film being firmly connected on both sides with textile threads that lie parallel and close to one another and that have on one side a direction differing by 90° from that of the threads on the other side.

PAUL NOWAK.